UNITED STATES PATENT OFFICE.

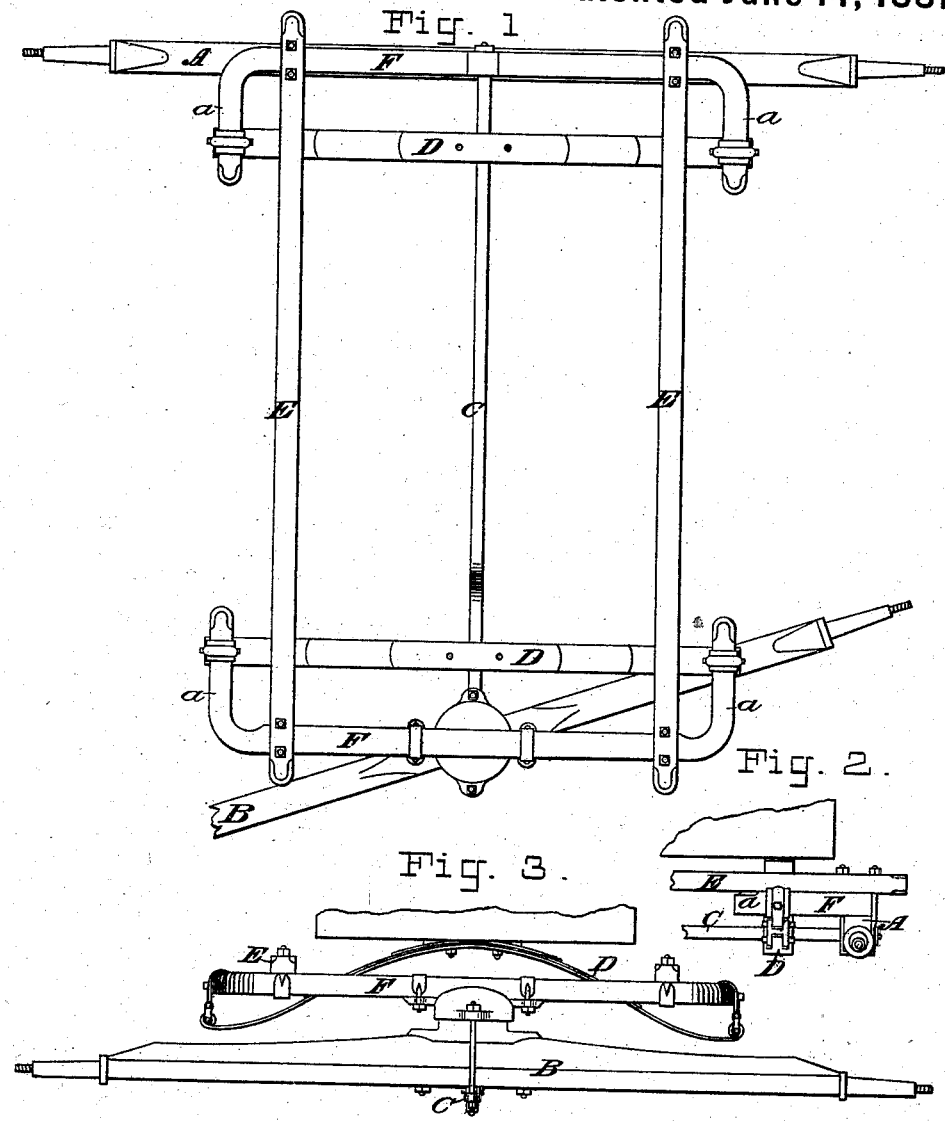

PETER CAMPBELL, OF AUGUSTA, KENTUCKY, ASSIGNOR OF TWO-THIRDS TO FRED. A. NEIDER AND JOHN A. HOPKINS, OF SAME PLACE.

SPRING-VEHICLE.

SPECIFICATION forming part of Letters Patent No. 242,750, dated June 14, 1881.

Application filed November 30, 1880. (No model.)

*To all whom it may concern:*

Be it known that I, PETER CAMPBELL, a subject of the Queen of Great Britain, residing at Augusta, Bracken county, Kentucky, have invented certain Improvements in Spring-Vehicles, of which the following is a specification.

My invention relates to that class of vehicles in which the springs are arranged transversely or parallel to the bolster; and the object is to provide bearings for the extremities of the semi-elliptic springs beyond the line of the side bars, for the reasons hereinafter given.

The invention consists in the features of construction and arrangement hereinafter distinctively set forth and claimed.

In the drawings, which serve to illustrate my invention, Figure 1 is a plan of a vehicle embodying my improvements, with the body and wheels removed. Fig. 2 is a side elevation of a part of the same. Fig. 3 is a front elevation of the same, showing a part of the body.

Let A and B represent, respectively, the forward and hind axles of a vehicle; C, the perch or reach; D D, semi-elliptic springs on which the body is mounted, and E E side bars. These elements are of themselves common in vehicles.

As ordinarily constructed and arranged, the ends of the springs in such vehicles are attached or shackled to the side bars, and as these, when placed wide apart, are in the way of the wheels in turning short, it follows that short springs must be used, as the side bars cannot be spread far enough to suit long ones.

To enable me to employ longer springs, and thus get a greater amount of elasticity and steadiness, I employ bolsters F F, constructed substantially as shown. These bolsters have arms *a a* at their extremities, turned inward substantially at right angles to the bolsters proper, and to these arms the springs are connected by means of shackles or other suitable attachments. These arms may be formed in one piece with the bolster by making the latter of bent wood, and this is the preferred method of constructing them; but the arms might be made separately and secured to the bolster. To add strength to the structure, and to prevent torsion of the bolster when the weight is thrown upon the springs, the side bars, E, are secured to the bolsters by means of bolts, stirrups, or clips, substantially as represented.

By this construction I am enabled to secure all of the advantages of a modern side-bar vehicle, and to obtain, also, greater elasticity than they possess, owing to their peculiar construction, as before stated.

The construction shown leaves an open space between the free ends of the arms *a a* on each side, into which the wheels may enter in turning short.

I am aware that in vehicles employing no side bars, and having transverse elliptic springs at each end, the lower half of the elliptic spring which is mounted on the axle has been constructed with its ends bent over to receive the upper half of the spring upon which the body is mounted. This throws the upper and lower halves of the spring out of the same vertical plane, the object being in part to set the body lower, and in part to employ a bed shorter than the reach.

My invention is applied exclusively to side-bar vehicles, and only a semi-elliptic spring is employed to support the body. The bolster, to the bent ends of which the spring is shackled, is non-elastic, and the side bars are securely attached thereto.

Having thus fully set forth the distinctive characteristics of my invention, I claim—

1. The bolsters of a spring-vehicle, provided with short arms *a a* at their extremities, in combination with the side bars secured rigidly thereto, all arranged substantially as and for the purposes set forth.

2. In a side-bar vehicle, the combination, with the axles, of the bolsters mounted thereon, and provided with short arms *a a* at their extremities, the side bars secured rigidly to the said bolsters, and the transverse springs mounted on and shackled to the said arms *a a*, substantially as and for the purposes set forth.

3. The combination, in a vehicle, of the axles, the springs, the side bars, and the bolsters F, of bent wood, having arms *a a*, bent on their ends to form supports for the springs, substantially as and for the purposes set forth.

In witness whereof I have hereunto signed my name in the presence of two subscribing witnesses.

PETER CAMPBELL.

Witnesses:
T. F. MARSHALL,
T. T. ARMSTRONG.